United States Patent [19]
Johnson

[11] Patent Number: 4,613,916
[45] Date of Patent: Sep. 23, 1986

[54] INFORMATION STORAGE DISK TRANSDUCER POSITION CONTROL SYSTEM REQUIRING NO SERVO PATTERN ON THE STORAGE DISK

[75] Inventor: Mark Johnson, Mt. Kisco, N.Y.

[73] Assignee: International Business Machines Corporation, Armonk, N.Y.

[21] Appl. No.: 566,942

[22] Filed: Dec. 30, 1983

[51] Int. Cl.[4] .......................... G11B 21/08; G01P 3/36
[52] U.S. Cl. .......................... 360/78; 360/73; 360/77; 318/640; 356/28.5; 369/32
[58] Field of Search .................. 360/73, 75, 77, 78; 369/30, 32, 33, 111; 318/640; 356/27, 28, 28.5

[56] References Cited

U.S. PATENT DOCUMENTS

| | | | |
|---|---|---|---|
| 3,426,337 | 2/1969 | Black et al. | 340/174.1 |
| 3,634,682 | 1/1972 | Gold | 318/640 |
| 3,687,517 | 8/1972 | Brun | 356/28 |
| 3,720,924 | 3/1973 | Aagard | 369/32 |
| 4,067,044 | 1/1978 | Maeda et al. | 360/77 |
| 4,104,573 | 8/1978 | Goshima et al. | 318/640 |
| 4,221,995 | 9/1980 | Barkman | 318/640 |
| 4,371,902 | 2/1983 | Baxter et al. | 360/77 |
| 4,470,696 | 9/1984 | Ballard | 356/28.5 |
| 4,499,572 | 2/1985 | Yoshikawa et al. | 369/111 |

FOREIGN PATENT DOCUMENTS

| | | | |
|---|---|---|---|
| 2107135 | 8/1972 | Fed. Rep. of Germany. | |
| 54-116901 | 9/1979 | Japan | 369/111 |
| 57-46355 | 3/1982 | Japan | 360/73 |
| 57-197486 | 12/1982 | Japan | 356/28.5 |

OTHER PUBLICATIONS

IBM TDB, vol. 25, No. 3A, "Optical Sensor for Track Location in Magnetic Disk Memory", Levenson, 8/82, pp. 1099-1102.
Control Engineering, "Lasers Boost Machine Tool Accuracy", Budzilovich, 12/68, pp. 62-66.
Instruments and Control Systems, "Optical Diffraction Velocimeter", Stavis, 2/66, pp. 99-102.
M. D. Levenson, "Laser Interferometry Technique for Track-Following Servo Control of DASD Head Location", IBM Technical Disclosure Bulletin, vol. 25, No. 3A, Aug. 1982, pp. 1103-1107.

*Primary Examiner*—Raymond F. Cardillo
*Assistant Examiner*—Steven R. Garland
*Attorney, Agent, or Firm*—Ronald L. Drumheller; Alexander Tognino

[57] ABSTRACT

The radial position of a transducer used to read and/or write information into or write information into or from a spinning information storage disk (optical or magnetic) is servo controlled by an optical doppler interferometer mounted at least in part for common movement with the transducer. The optical doppler interferometer measures the instantaneous linear velocity of the information storage disk at the position of the transducer (or at a fixed relative position with respect to the transducer) and the position of the transducer is controlled so as to make the measured instantaneous linear velocity follow a reference signal corresponding with the desired information storage track.

11 Claims, 6 Drawing Figures

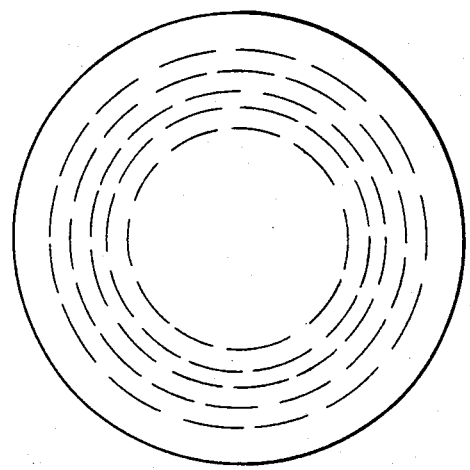
FIG 5.2
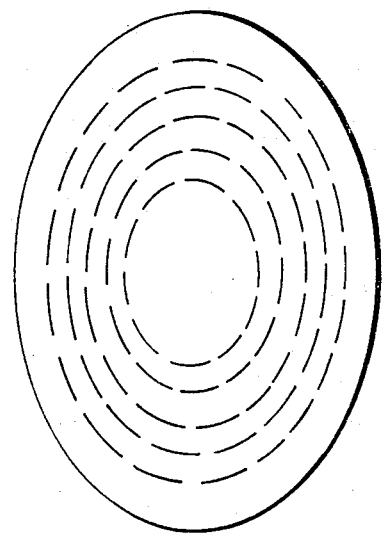
FIG. 5.1

INFORMATION STORAGE DISK TRANSDUCER POSITION CONTROL SYSTEM REQUIRING NO SERVO PATTERN ON THE STORAGE DISK

TECHNICAL FIELD

This invention relates to servo systems for controlling the position of a transducer with respect to a spinning information storage disk, and more particularly it relates to an optical servo system for controlling the radial position of a read and/or write head with respect to a magnetic storage disk, especially a flexible magnetic disk, without applying a servo pattern to the disk.

BACKGROUND ART

It is generally desirable to increase as much as practical the amount of data which can be stored on an information storage disk. Data is generally stored on a disk along concentric circular tracks. Obviously, it is desirable to fit as many tracks as possible on a disk surface, which means that the tracks should be as narrow as practical and as close together as practical. However, it is also necessary to position a transducer over the middle of any desired track and to keep it there during rotation of the disk while data is written into the track or read from the track. As the tracks become ever smaller in width and are spaced closer and closer together, it becomes ever more difficult to correctly position the read and/or write transducer. In reality it is the ability to reliably position a transducer over the center of a desired track and to keep it so positioned during rotation of the disk which limits the practical density of the recording tracks. With magnetic storage disks, typically an open loop positioning system with no feedback control is used to coarse position either one or an array of read/write transducers over a desired track. With flexible magnetic storage disks, this usually is the only positioning system for the transducer. With rigid magnetic storage disks, coarse positionment is generally followed by fine positionment using a positioning system with feedback control to precisely position the transducer over the center of the desired track and to keep it there. The fine positioning system generally locks onto and tracks a magnetic pattern of some kind.

Most of these magnetic servo schemes use a portion of the recording surface for a magnetic servo pattern. This obviously reduces the amount of recording surface available for the recording of data. Accordingly, non-magnetic servo schemes have been proposed, which have the obvious advantage that the servo pattern will not reduce the amount of surface area available for magnetic storage of data.

U.S. Pat. No. 3,426,337 describes such a scheme in which an optical servo controls the transducer position. Unfortunately, in this scheme and in all such optical servo schemes known, a pattern of some kind must be recorded on or must be imprinted on the disk so that the servo control system has a reference. This requirement significantly increases the cost of achieving optical servo control of a magnetic disk transducer and has virtually foreclosed such servo control in the low cost flexible disk field.

It is an object of this invention to provide a servo control system for positioning a transducer with respect to an information storage disk without using a reference pattern on the storage disk.

Another object is to provide a practical optical servo system for control of the read/write transducer in a flexible magnetic disk storage system.

DISCLOSURE OF THE INVENTION

In accordance with this invention, the radial position of a transducer used to read and/or write information into or from a spinning information storage disk (optical or magnetic) is servo controlled by an optical doppler interferometer mounted at least in part for common movement with the transducer. The optical doppler interferometer measures the instantaneous linear velocity of the information storage disk at the position of the transducer (or at a fixed relative position with respect to the transducer) and the position of the transducer is controlled so as to make the measured instantaneous linear velocity follow a reference signal corresponding with the desired information storage track.

Each information storage track is characterized by a discrete linear velocity value at an assumed nominal angular velocity of the disk. Each track is defined as having the physical path along which the instantaneous linear velocity measured by the optical doppler interferometer will be constantly equal to the discrete linear velocity value characteristic of that track, provided the angular velocity of the disk is held equal to the assumed nominal angular velocity and the disk is not radially stretched. If the disk is not radially stretched, these track paths are concentric circles of different radius centered upon the disk spindle.

If the angular velocity of the disk is accurately held at the assumed angular velocity, the reference signal which the measured instantaneous linear velocity follows for a particular recording track has a constant value equal to the discrete linear velocity value characteristic of that track. Alternatively, the actual angular velocity of the disk can be measured and the reference signal appropriately scaled to dynamically compensate for any difference between the actual and assumed angular velocity of the disk.

In still another embodiment, a second optical doppler interferometer measures the instantaneous linear velocity of the information storage disk at the disk perimeter. The reference signal for a particular track is then proportional to the product of the discrete linear velocity characteristic of that track and the instantaneous linear velocity at the disk perimeter. This embodiment has the advantage that variations in the angular velocity of the information storage disk as well as radial stretching of the disk are automatically compensated.

BRIEF DESCRIPTION OF THE DRAWINGS

FIG. 5.1 is a plan view of the typically non-circular magnetic recording tracks defined by the servo system of FIG. 4 when the storage disk is radially stretched.

FIG. 5.2 is a plan view of the typically circular and concentric magnetic recording tracks defined by the servo system of FIG. 4 when the storage disk is not radially deformed.

DESCRIPTION OF THE PREFERRED EMBODIMENTS

Figure 1:
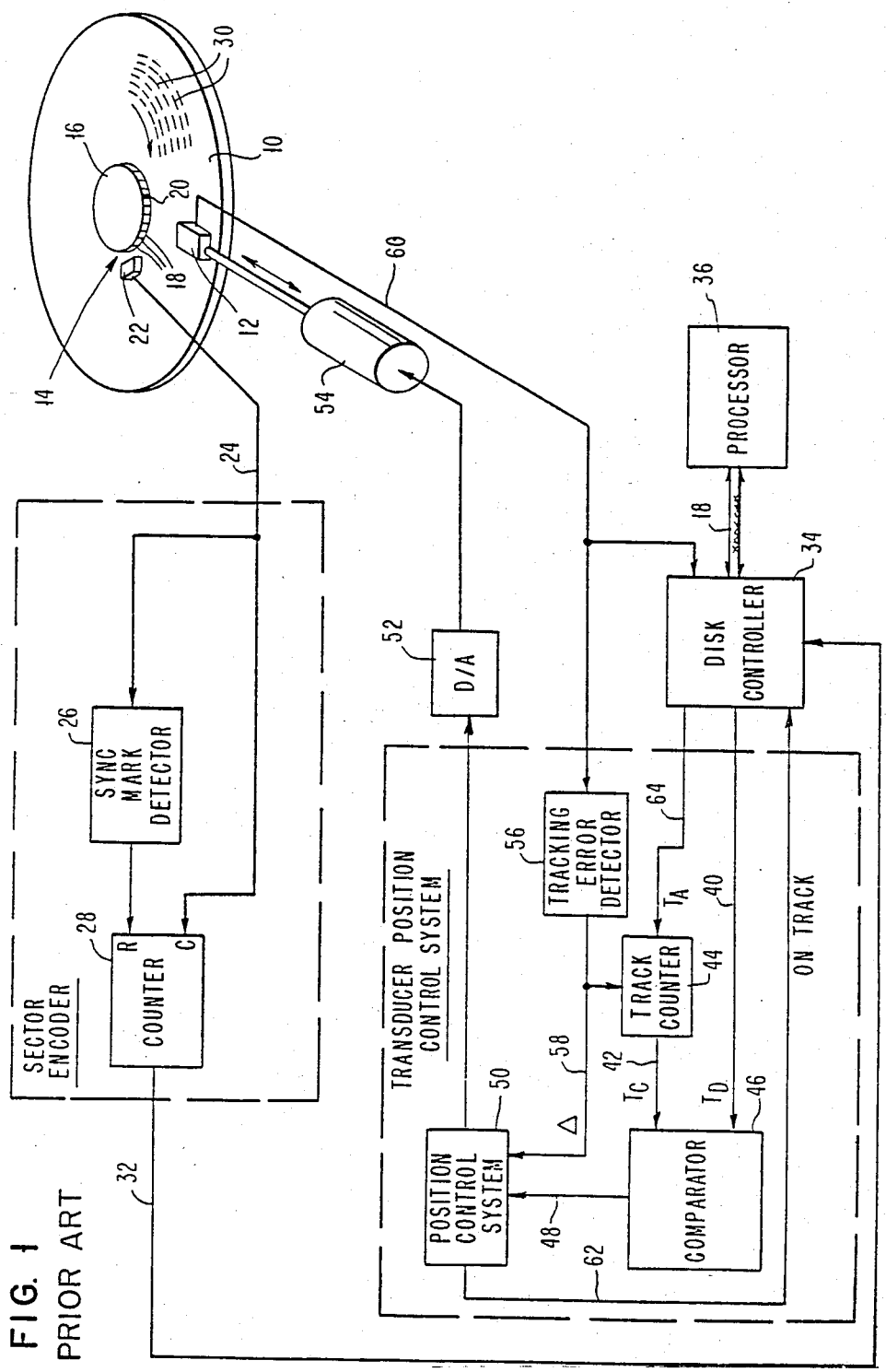
FIG. 1 schematically illustrates a prior art transducer control system for a magnetic information storage disk.

FIG. 1 schematically illustrates a magnetic information storage disk 10 and a typical prior art position control system for an associated transducer 12. Concentric magnetic tracks 30 on the disk are typically divided angularly into many equal sectors so that the position of stored information can be referenced to a particular sector beginning. Tachometer 14 supplies a signal from which the sectors are both defined and identified. A timing wheel 16 keyed to disk 10 carries timing marks 18 (which may or may not correspond one for one with sectors), as well as a distinguishable sync mark 20. The marks 18 and 20 are sensed by a suitable detector 22 (such as an optical detector, for example), which produces a signal on line 24.

Counter 28 counts marks 18 and is reset by sync mark detector 26 each time it senses the signal waveform corresponding to the sync mark 20. As a result, the output of counter 28 is a discrete representation of the angular position of the disk 10 and directly or indirectly identifies the sector under transducer 12. The sector identifying information is received by a disk controller 34 via line 32.

A data source or data utilization device, such as a processor 36, originates a data transfer operation via lines 38 to disk controller 34. Disk controller 34 identifies on line 40 the track desired ($T_D$) for the next data transfer operation. The current track ($T_C$) under the transducer 12 is identified on line 42 by a track counter 44. Both the desired track $T_D$ and the current track $T_C$ are typically digital numbers. Comparator 46 inspects $T_D$ and $T_C$ and indicates via line 48 whether a coarse movement of transducer 12 is needed, the direction of such movement, and possibly the size of the required move.

A position control system 50 responds to comparator 46 and via digital-to-analog converter 52 drives a linear actuator 54 connected to transducer 12 so as to bring transducer 12 over the desired track. A tracking error detector 56 ordinarily senses whether transducer 12 is centered over a track and indicates the amount of tracking error on line 58 to the position control system 50, which drives actuator 54 so as to reduce the tracking error and keep the transducer 12 centered over the track. When a coarse move is needed (to a different track), control system 50 disregards the tracking error. Track counter 44, however, typically senses from the tracking error signal the passage of the transducer over each track and keeps count of the track currently under the transducer ($T_C$). Comparator 46 senses when $T_C$ is equal to $T_D$ and so indicates to the position control system 50. After $T_C$ is equal to $T_D$, the control system 50 again responds to the tracking error signal from detector 56 and locks the transducer position onto the center of the track. Once the transducer is sufficiently close to the center of the desired track, an ON TRACK indication is given by the position control system to the disk controller via line 62.

The tracking error detector responds to magnetically recorded information on the disk 10, which is extracted from the signal output line 60 connected directly to transducer 12. Various ways are known in the art for sensing or deriving tracking error information either directly from auxiliary prerecorded magnetic patterns or indirectly from the magnetically recorded data track itself. Since the exact method used for extracting the tracking information from the magnetic transducer 12 signal is not significant to the present description, a detailed description of such techniques will not be presented. The magnetic transducer signal on line 60 is also received by the disk controller 34 so that recorded information on the desired track can be read and transferred to processor 36 and so that information from processor 36 can be recorded on the desired track via controller 34 and line 60.

Each track typically has a prerecorded header containing among other information a digital identification of the track itself. The track identification is read (either by the processor or the disk controller) to verify that the desired track is the track currently being accessed. If the track header indicates that the accessed track is not the desired track, even though the control system has given an ON TRACK indication via line 62, an error has occurred. Some prior art systems re-initiate the track seeking procedure again in the hope that the same error will not reoccur. Others have a way of updating or correcting the track counter via a line 64 so that the $T_C$ indicated by the track counter matches the actual track ($T_A$) read from the track. In such systems the change in $T_C$ is sensed by comparator 46, which results in movement of the transducer 12 to the correct track $T_D$.

Figure 2:
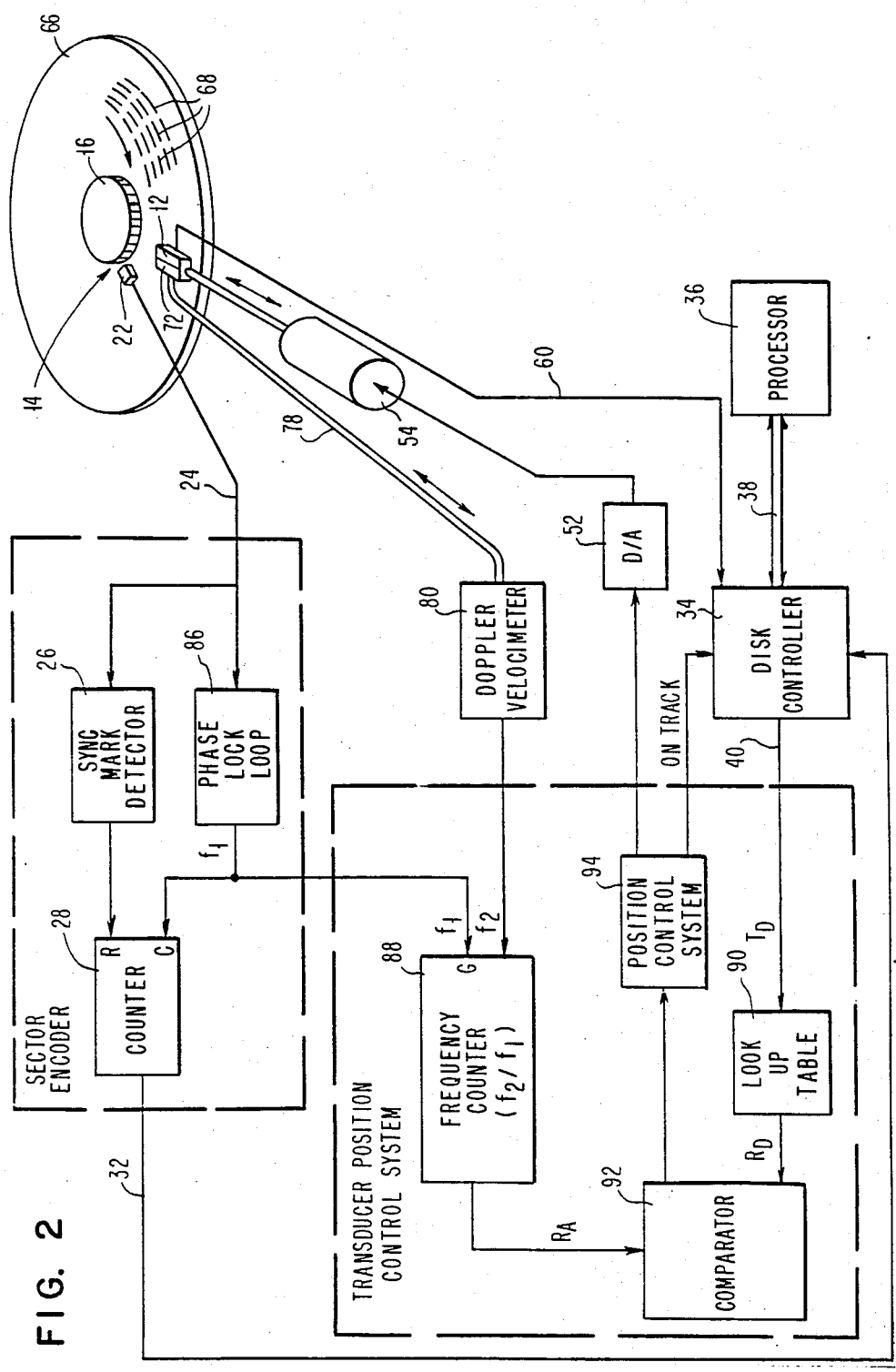
FIG. 2 schematically shows an optical doppler interferometer servo control system for a magnetic information storage disk in accordance with this invention.

FIG. 2 schematically illustrates in a fashion similar to the FIG. 1 representation a magnetic information storage disk 66 and an associated transducer position control system fabricated in accordance with this invention. Magnetic storage disk 66 is similar to disk 10 described in connection with FIG. 1 except that disk 66 contains no prerecorded pattern of any kind (magnetic or otherwise). Magnetic storage tracks 68 are defined in position and shape on disk 66 by the illustrated transducer position control system (hereinafter sometimes referred to as the servo control system) rather than by a prerecorded reference pattern on the disk as in the prior art system illustrated in FIG. 1. In FIG. 2, each magnetic storage track is characterized and defined by a discrete linear velocity value and lies along (or adjacent to) the physical path where the instantaneous linear velocity of the disk spinning at an assumed nominal angular velocity is equal to the discrete linear velocity value characteristic of that track. If the angular velocity of the spinning disk is held constant, this path is a circle concentric with the center of the spinning disk. Different discrete linear velocity values characterize each separate track and correspond with circular tracks having different radii.

Figure 3:
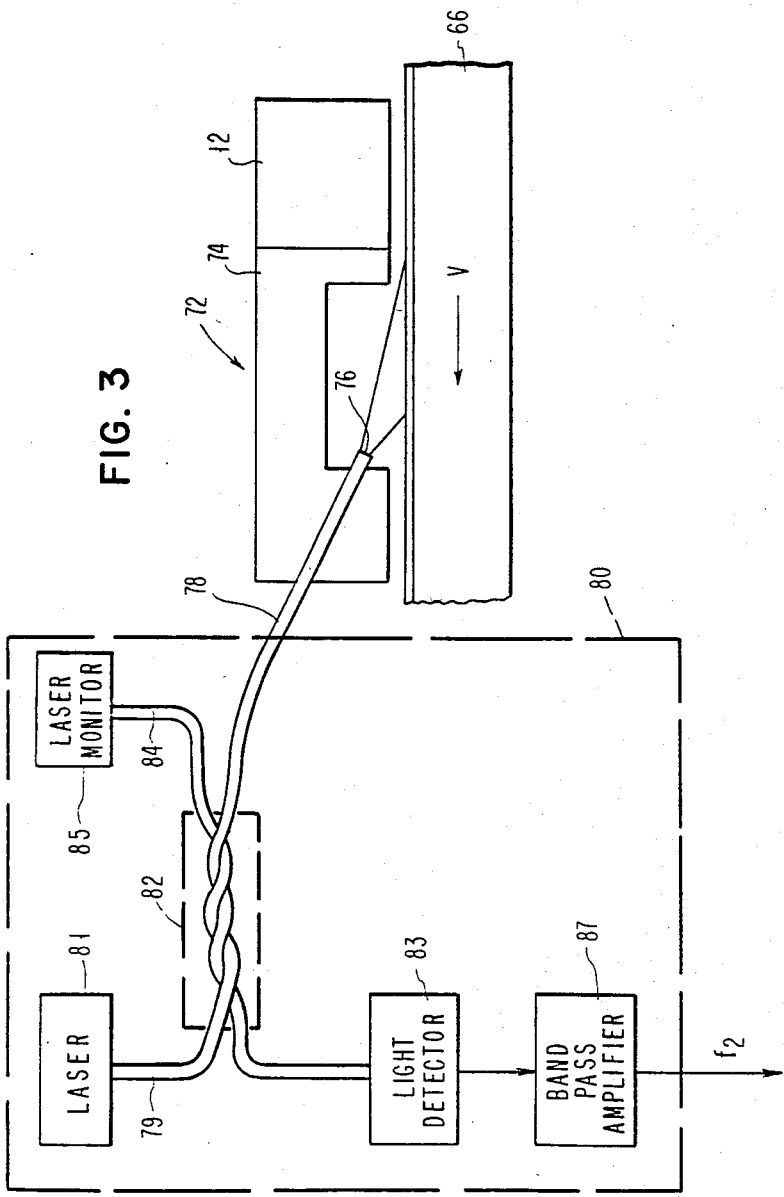
FIG. 3 schematically illustrates an optical doppler interferometer with the optical probe head portion shown in cross section.

The instantaneous linear velocity of the information storage disk at the position of the transducer 12 is measured by an optical doppler velocimeter effectively mounted for common movement with the transducer. Although, in theory, an entire optical doppler velocimeter could be mounted for common movement with transducer 12, FIG. 2 illustrates an alternative mounting scheme in which only an optical probe head 72 is mounted for common movement with transducer 12. FIG. 3 shows the optical probe head 72 in cross section. Head 72 comprises a frame 74 attached to transducer 12 and supporting one end 76 of an optical fiber 78. The other end of optical fiber 78 is connected to an optical doppler velocimeter 80 of conventional design. As schematically shown in FIG. 3, velocimeter 80 includes a source of light, such as a laser 81, a light detector 83, a light coupler 82 and signal conditioning electronics 87. In operation, laser 81 launches a light beam which travels along fiber 79. Some of this laser light passes through optical coupler 82 (illustrated as a fused twisted pair of optical fibers) and travels along fiber 78 to exit at fiber end 76 and illuminate a region of the disk 66 surface adjacent to transducer 12. Another portion of the laser light travels from coupler 82 along fiber 84 to an optional laser monitor 85. The illuminating light beam is inclined with respect to the disk surface and is oriented (aligned) along the linear velocity direction V of the disk. Some of this light is scattered back to fiber end 76 and returns along fiber 78 to coupler 82 where it interferes in coupler 82 with the light coming from the laser 81 to create a beat signal having a frequency proportional to the instantaneous velocity of the disk at the probe head. The interfering optical signal is sensed by detector 83 and the beat signal extracted by a band pass amplifier 87 to yield a signal $f_2$ having a frequency proportional to the instantaneous linear velocity of the disk at the transducer. If the angular velocity of the disk remains constant, the instantaneous linear velocity of the disk under the transducer is directly proportional to the radial position of the transducer.

Since the recording tracks are located and followed by a servo system which relies only upon the instantaneous velocity of the disk at the transducer and the absolute magnitude of this velocity at any particular radial position varies proportionally with the rotation speed (angular velocity) of the disk, either the rotation speed of the disk must be very accurately controlled or it must be measured and used to correct or compensate the measured linear velocity of the disk at the transducer. Since accurate control of the disk angular velocity would probably still require sensing or measurement of the disk angular velocity anyway, it is preferred that the measured disk angular velocity be used directly to compensate the measured instantaneous linear velocity of the disk at the transducer.

Referring again to FIG. 2, a tachometer 14 is shown which operates much the same as the tachometer 14 shown in FIG. 1 and described in detail in connection therewith. Similar reference numbers are used in the drawings to identify corresponding parts. A reference frequency $f_1$ is derived from the tachometer signal on line 24 by passing the signal through a phase lock loop 86 to remove the tachometer sync mark waveform detected by the sync mark detector 26. Reference frequency $f_1$ thus represents the angular velocity of the disc. Sector identifying information is derived and sent to disk controller 34 via line 32 as previously described.

The instantaneous linear velocity of the disk at the transducer is represented in FIG. 2 as an instantaneous frequency $f_2$ received from the optical doppler velocimeter 80. It should be understood that certain signal conditioning or processing functions may or may not be performed on the raw velocimeter signal before it actually reaches frequency counter 88 as illustrated. The frequency counter itself automatically applies the equivalent of a thresholding and clipping function in any event.

Frequency counter 88 produces an output digital signal $R_A$ which is proportional to the ratio between $f_1$ and $f_2$. Since $f_1$ represents the instantaneous angular velocity of the disk and $f_2$ represents the instantaneous linear velocity of the disk at the transducer, $R_A$ represents the instantaneous linear velocity of the disk at the transducer after it has been compensated or scaled by the measured instantaneous angular velocity of the disk. In FIG. 2, $R_A$ also is a measure of the actual radial position of the transducer.

As in the FIG. 1, a data source or data utilization device, such as a processor 36, originates a data transfer operation via lines 38 to disk controller 34. Disk controller 34 identifies on line 40 the track desired ($T_D$) for the next data transfer operation. The desired track $T_D$ is typically a digital number from which the corresponding linear velocity value $R_D$ characteristic of the desired track $T_D$ must be obtained ($R_D$ is also a measure of the radius of the desired track). This conversion is a simple one-for-one transformation, which is conveniently done in practice by using a look up table 90. This conversion may be done and it is contemplated that it usually will be done by the same processor which implements other functions, such as the disk controller functions. For illustration, various functions are shown as separate blocks when in practice many of the functions would be implemented with a single processor suitably programmed to perform these functions.

The actual radius position $R_A$ of the transducer (obtained by computing the ratio between the measured linear velocity of the disk at the transducer and the measured angular velocity of the disk) is then compared with the desired radius position $R_D$ of the transducer by a comparator 92. The difference or error is sent to a position control system 94 which drives linear actuator 54 via A/D converter 52 so as to reduce the error. When the error reported by comparator 92 is sufficiently small the transducer is assumed to be on the desired track and an ON TRACK indication is reported to disk controller 34 so that data can be written into or read from the desired track by the disk controller. In the embodiment just described, the transducer is moved to a radial position such that the linear velocity sensed by the optical doppler velocimeter divided by the sensed angular velocity of the disk becomes equal to the value characterizing and defining the desired track and keeps adjusting the radial position of the transducer so as to maintain this condition.

Figure 4:
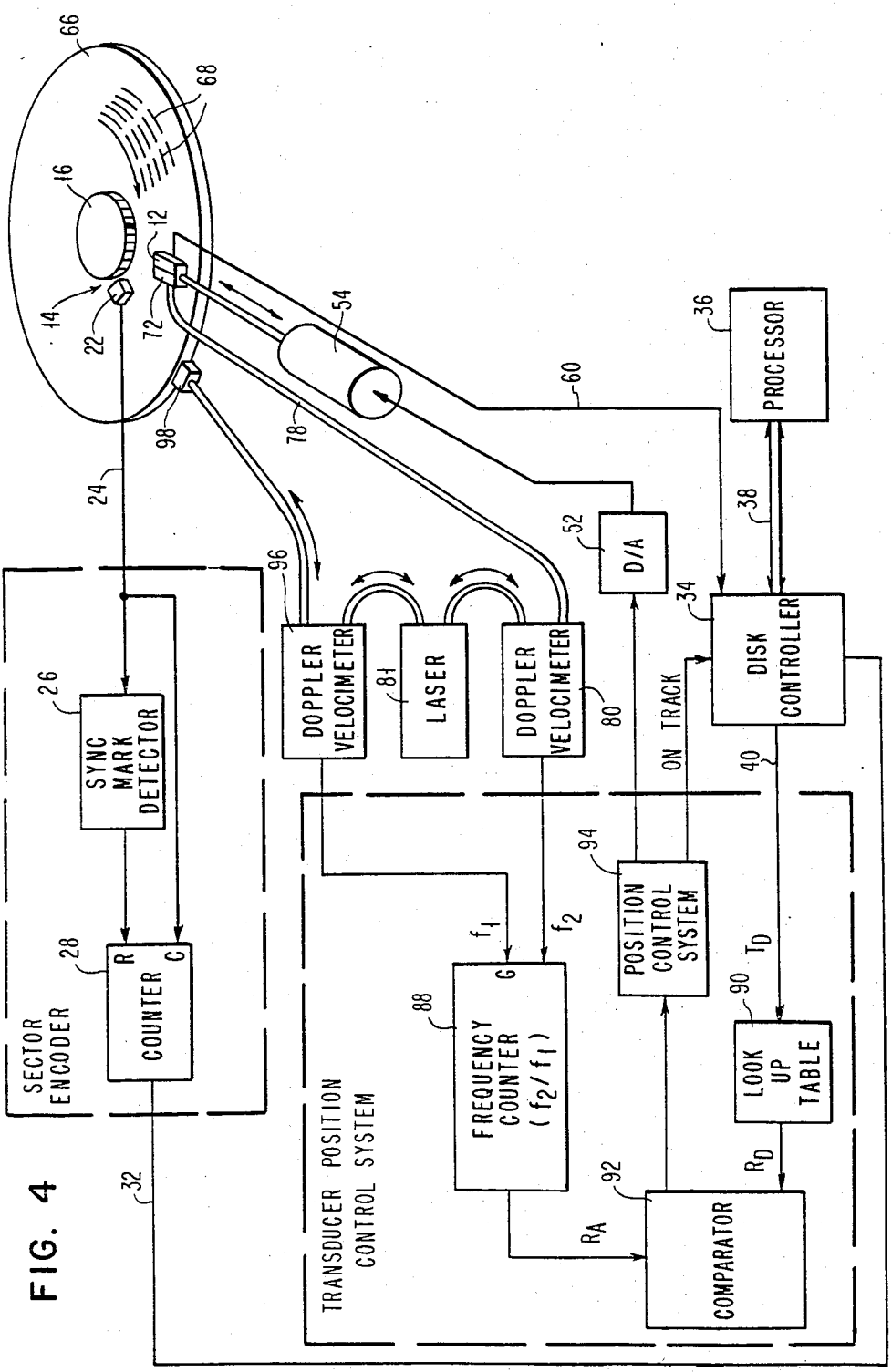
FIG. 4 schematically shows an optical servo control system having two optical doppler interferometers in accordance with this invention.

Another embodiment of this invention is illustrated in FIG. 4. In this embodiment, the measured linear velocity $f_2$ of the disk at the transducer is scaled not by the measured angular velocity of the disk, but instead is scaled by the instantaneous linear velocity of the disk at the perimeter of the disk, measured preferably at an angular position on the disk equal to or slightly ahead of the angular position of the transducer (FIG. 4 shows a difference in angular position). The instantaneous linear velocity of the perimeter of the disk may be measured in any fashion but in FIG. 4 it is conveniently measured by a second optical doppler velocimeter 96. Each of the doppler velocimeters 80, 96 may be driven by the same laser 81 as shown. A second optical probe head 98 is shown and functions similarly to probe head 72 previously described.

The second velocimeter 96 measures the instantaneous linear velocity of the disk at the perimeter thereof in the same way that velocimeter 72 measures the instantaneous linear velocity of the disk at the transducer and produces a signal $f_1$ representing the linear velocity of the perimeter of the disk. The signals $f_1$ and $f_2$ in this embodiment are handled exactly the same as were the correspondingly identified signals in the embodiment shown in FIG. 2. In fact, if the perimeter of the disk has a constant radius, the embodiment of FIG. 2 and the embodiment of FIG. 4 are functionally equivalent, since in such event $f_1$ in each embodiment is proportional to and may be viewed as representing the instantaneous angular velocity of the disk.

A difference occurs, however, if the disk radially deforms while it spins so that it has a varying radius at the perimeter. The signal $f_1$ then instead scales the measured instantaneous velocity of the disk at the transducer so as to cause the transducer to follow a track which is not circular. The path followed by the transducer instead tends to increase in radial position whenever the perimeter has an increase in radius and tends to decrease in radial position whenever the perimeter has a decrease in radius. This is illustrated in FIG. 5.1 where the tracks 68 become elliptical when the disk shape becomes elliptical and become circular (FIG. 5.2) when the disk shape becomes circular. With the embodiment of FIG. 4, the transducer will follow the same physical path on the disc even when it becomes temporarily or permanently deformed in the radial direction. A track recorded while the disk is not deformed thus can still be read even though the disk becomes radially deformed (or the other way around). This is particularly advantageous because magnetic recording disks (especially flexible ones) experience some radial stretching while spinning at high speed and the amplitude of the stretching (as well as possibly the orientation thereof) may change with age. Since the embodiment of FIG. 4 compensates to some extent for this problem the track density is not automatically limited by the stretching.

Having thus described my invention, what I claim as new and desire to secure by Letters Patent is:

1. Information storage disk apparatus, comprising:
   an information storage disk having a plurality of separate information storage tracks,
   the location and path of each of said information storage tracks being defined by a discrete linear velocity;
   means for storing the discrete linear velocity defining each of said tracks;
   a transducer radially positionable over any desired one of said tracks for reading information from or writing information into any one of said plurality of information storage tracks;
   means for rotating said disk;
   linear velocity sensing means mounted at least in part for common movement with said transducer for sensing a linear velocity,
   said linear velocity sensing means being responsive to the linear velocity of said disk at said transducer;
   comparison means in communication with said storage means and responsive to said linear velocity sensing means for comparing the linear velocity sensed by said sensing means with the storage discrete linear velocity defining a desired track; and
   control system means responsive to said comparison means for radially positioning said transducer such that said sensed linear velocity corresponds with the stored discrete linear velocity defining the desired track,
   whereby said transducer is positioned over the desired track for reading information from or writing information into said desired track.

2. Information storage disk apparatus as defined in claim 1 wherein said linear velocity sensing means comprises an optical doppler interferometer for measuring the linear velocity of said disk at said transducer.

3. Information storage disk apparatus as defined in claim 2 wherein said linear velocity sensing means further comprising:
   means for sensing the angular velocity of said disk,
   said sensed linear velocity being proportional to the linear velocity measured by said optical doppler interferometer and inversely proportional to the sensed angular velocity of said disk.

4. Information storage disk apparatus as defined in claim 3 wherein said means for sensing the angular velocity of said disk comprises a second optical doppler interferometer.

5. Information storage disk apparatus as defined in claim 2 wherein said linear velocity sensing means further comprises:
   means for sensing the linear velocity of the perimeter of said disk,
   said sensed linear velocity being proportional to the linear velocity measured by said optical doppler interferometer and inversely proportional to the sensed linear velocity of said disk.

6. Information storage disk apparatus as defined in claim 5 wherein said means for sensing the linear velocity of the perimeter of said disk is a second optical dopper interferometer.

7. Information storage disk apparatus as defined in claim 1 wherein said tracks are concentric and circular.

8. Information storage disk apparatus as defined in claim 1 wherein said disk is a magnetic information storage disk.

9. Information storage disk apparatus as defined in claim 1 wherein said means for rotating said disk rotates said disk at a predetermined nominal angular velocity.

10. Information storage disk apparatus as defined in claim 1 wherein said linear velocity sensing means measures the linear velocity of said disk under said transducer.

11. Information storage disk apparatus as defined in claim 1 wherein said storage means comprises a look up table.

* * * * *